US006239864B1

(12) United States Patent
Okamoto

(10) Patent No.: US 6,239,864 B1
(45) Date of Patent: *May 29, 2001

(54) IMAGE FORMING APPARATUS WITH A PAPER POSITIONING DEVICE

(75) Inventor: Masami Okamoto, Kanagawa (JP)

(73) Assignee: Ricoh Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,240

(22) Filed: Apr. 28, 1999

(30) Foreign Application Priority Data

Apr. 30, 1998 (JP) ..................................... 10-121313

(51) Int. Cl.[7] ........................ G03B 27/52; G03B 27/00

(52) U.S. Cl. ..................................... 355/407; 355/40

(58) Field of Search ............................ 355/407, 400, 355/27, 72, 23–26; 271/240, 225, 3.03, 3.02, 3.19; 358/496; 399/402, 371, 401; 395/113; 474/84

(56) References Cited

U.S. PATENT DOCUMENTS 4,788,575 * 11/1988 Ito et al. ............................ 355/14
5,055,885 * 10/1991 Yoshikado et al. ................ 355/318
5,215,303 * 6/1993 Yamada et al. ...................... 271/240
5,709,382 * 1/1998 Shima ................................. 271/209
5,854,965 * 12/1998 Kasiwabara et al. ............... 399/381

FOREIGN PATENT DOCUMENTS 7-206224 8/1995 (JP) .
7-304544 11/1995 (JP) .

OTHER PUBLICATIONS

U.S. Patent Application 09/069,292 filed on Apr. 29, 1998.
U.S. Patent Application 09/053,796 filed on Apr. 2, 1998.
U.S. Patent Application 09/034325 filed on Apr. 3, 1998.

* cited by examiner

*Primary Examiner*—Russell Adams
*Assistant Examiner*—Hung Henry Nguyen
(74) *Attorney, Agent, or Firm*—Greenberg Traurig LLP

(57) ABSTRACT

In an image forming apparatus, a paper positioning device includes a pair of side fences. At least one of the side fences includes a positioning surface which is inclined a the direction of paper conveyance. The positioning surface is arranged to contact the widthwise edge of a paper in a manner substantially parallel to the edge of the paper so as to reliably and accurately correct any skew of the paper even when the side fence has some play or positional deviation.

8 Claims, 3 Drawing Sheets

IMAGE FORMING APPARATUS WITH A PAPER POSITIONING DEVICE

BACKGROUND OF THE INVENTION

1. Field of Invention

The present invention relates to an image forming apparatus which discharges a paper after turning the paper over and which is capable of forming images on both sides of a paper, as desired. More particularly, the present invention relates to an image forming apparatus including a paper positioning device for positioning a paper being conveyed in the apparatus.

2. Description of Related Art

Generally, an image forming apparatus which can print on both sides of a paper is selectively operable in the following three different modes. In a first mode, the apparatus directly discharges a paper having an image printed on one side thereof, in an orientation in which the printed image faces upwardly. This mode is hereinafter referred to as "the usual mode." In a second mode, the apparatus turns over the paper having an image printed on one side thereof via a turning mechanism and then discharges the paper such that the printed image on the first side is face down. This mode is hereinafter referred to as "the turn-over mode." In a third mode, the apparatus delivers the paper having a printed image on one side thereof from the turning mechanism to a two sided-printing mechanism or duplex mechanism and then feeds the paper again to an image forming section for forming an image on the other side of the paper. This mode is hereinafter referred to as "the duplex mode."

In the turn-over mode and the duplex mode, the paper having an image printed on one side thereof is apt to skew when the paper is turned over. It is a common practice with the above apparatus to use a paper positioning device for positioning the paper such that the paper does not skew before or after it is turned over, as disclosed in Japanese Patent Laid-Open Publication No. 7-206224 by way of example.

The problem with the conventional paper positioning device is that it requires a great number of mechanical parts which must be assembled together and cooperate to achieve the desired result. In addition, the conventional paper positioning device involves play or positional deviation caused by an inaccuracy in the size and position of the various mechanical parts making up the paper positioning device, as well as, changes caused by thermal expansion of such parts. The positional deviation or play prevents the paper positioning device from reliably and completely regulating the position of a paper and therefore, from accurately correcting the skew of the paper.

Other such devices relating to the present invention are also disclosed in, e.g., Japanese Patent Laid-Open Publication No. 7-304544.

SUMMARY OF THE INVENTION

To overcome the problems described above, preferred embodiments of the present invention provide an image forming apparatus including a paper positioning device which is arranged to reliably and accurately correct the skew of a paper despite the presence of play or positional deviation in the apparatus.

In accordance with a preferred embodiment of the present invention, an image forming apparatus includes a paper positioning device located at a paper conveyance path or a paper feeder and arranged to position opposite widthwise edges of a paper, the paper positioning device including a plurality of paper positioning members each including a positioning surface. At least one of the paper positioning members has an inclined positioning surface arranged such that incline extends in the direction of paper conveyance.

Also, in accordance with preferred embodiments of the present invention, a paper positioning device located at a paper conveyance path or a paper feeder for positioning opposite widthwise edges of a paper includes paper positioning members each including a positioning surface and each being movably mounted, and a drive mechanism for driving the paper positioning members so as to move the paper positioning members to desired positions. At least one of the paper positioning members has an inclined positioning surface arranged such that incline extends in the direction of paper conveyance.

BRIEF DESCRIPTION OF THE DRAWINGS

The above and other objects, features and advantages of the present invention will become more apparent from the following detailed description of preferred embodiments thereof and with reference to the accompanying drawings in which.

DETAILED DESCRIPTION OF PREFERRED EMBODIMENTS

Figure 1:
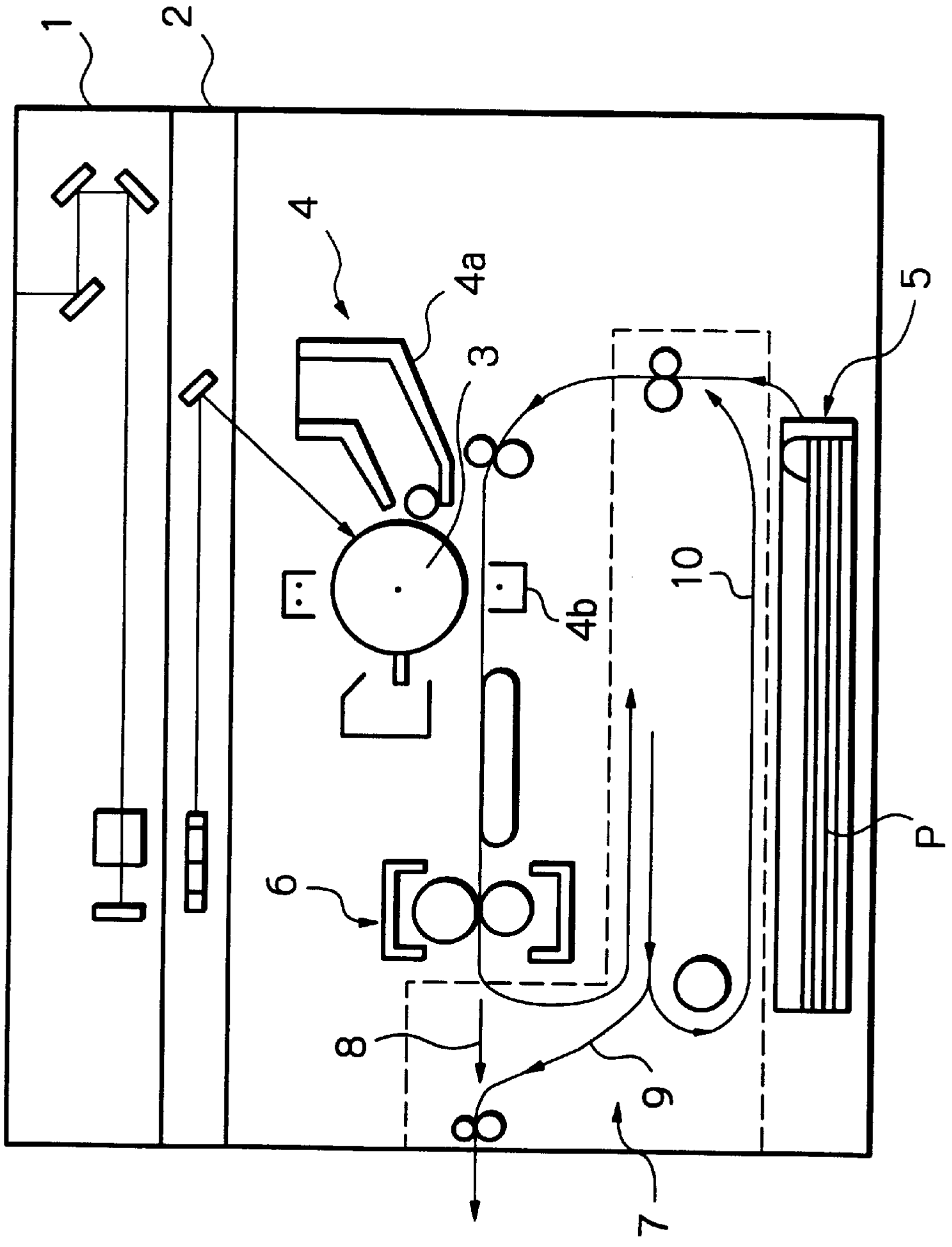
FIG. 1 is a view showing an image forming apparatus including a turn-over/duplex unit according to a preferred embodiment of the present invention.

Referring to FIG. 1, an image forming apparatus to which the present invention is applied is shown. As shown in FIG. 1, the image forming apparatus generally includes a scanning or reading unit 1, a writing unit 2, an image forming unit 4 including a photoconductive element 3, a paper feeding unit 5, a fixing unit 6, and a turn-over/duplex unit 7. The turn-over/duplex unit 7 includes a paper discharge path for the usual mode mentioned earlier. The photoconductive element 3 preferably is a photoconductive drum.

The scanning unit 1 scans a document to read an image present on the document. The writing unit 2 optically writes the image read via the scanning unit 1 on the drum 3 to thereby electrostatically form a latent image. The image forming unit 4 includes a developing device 4*a* and an image transfer device 4*b*. The developing device 4*a* develops the latent image to thereby forms a corresponding toner image on the drum 3. The image transfer device 4*b* transfers the toner image from the drum 3 to a paper P fed from the paper feeding unit 5. The fixing unit 6 fixes the toner image on the paper P.

In the usual mode, the paper P with the fixed toner image is driven out of the apparatus face up via a usual discharge path 8. In the turn-over mode, the paper P is driven out face down via a turn-over discharge path 9 included in the turn-over/duplex unit 7. Further, in the duplex mode, the paper P is again routed to the image forming unit 4 via a duplex path 10 with the already printed surface facing the drum 3 side.

Figure 2:
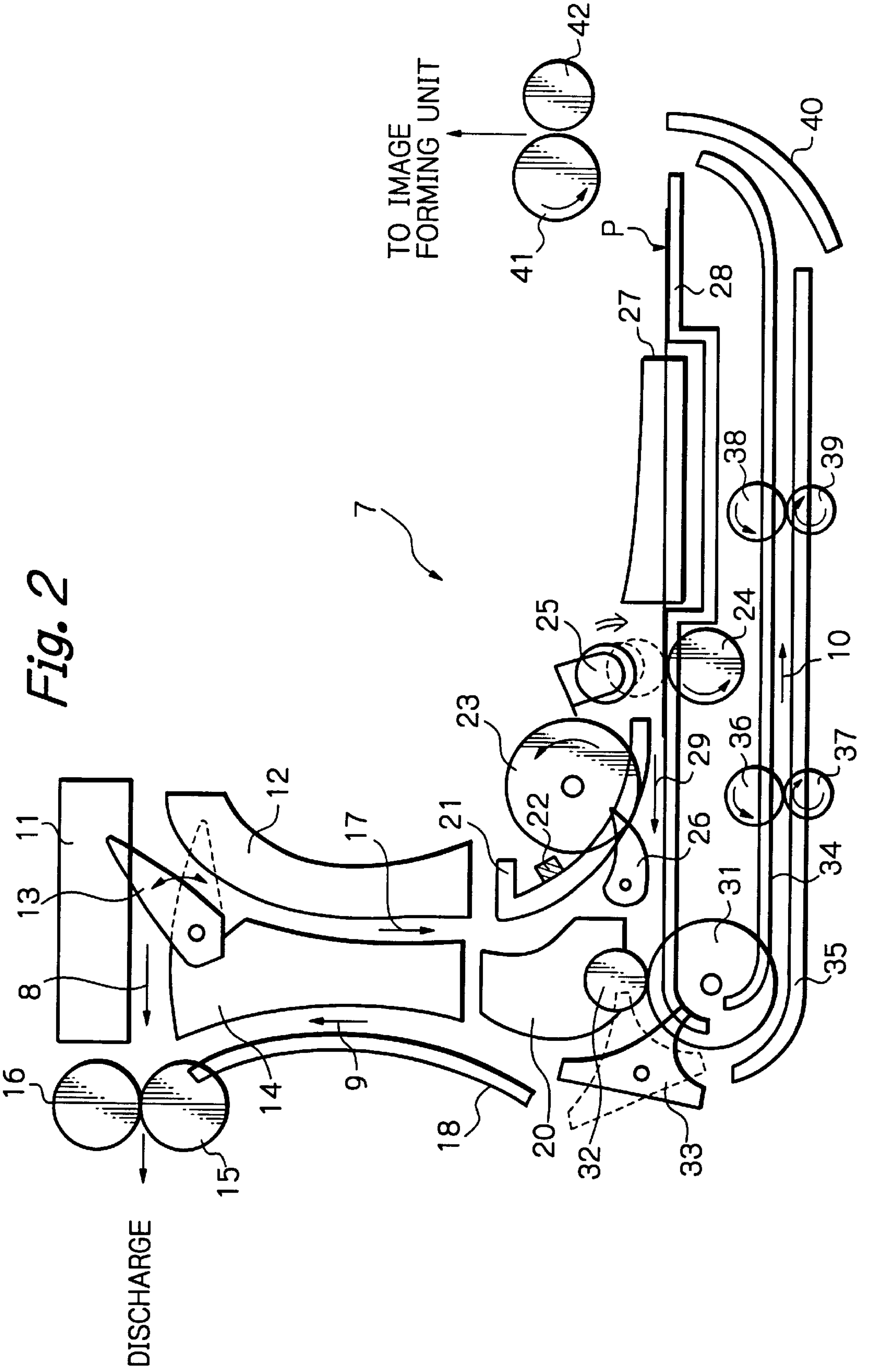
FIG. 2 is a fragmentary view showing the turn-over/duplex unit of FIG. 1 in detail.

FIG. 2 shows a turn-over/duplex unit 7 in detail. As shown, the turn-over/duplex unit 7 includes an upper guide 11, a lower guide 12 and a path selector 13 constituting a paper inlet section in combination. The path selector 13 is rotatably supported by an intermediate guide 14 at one end thereof, so that the other end of the paper selector 13 is angularly movable. A drive roller 15 and a driven roller 16 constitute a paper outlet section in combination. The lower guide 12 and intermediate guide 14 define therebetween a turn-over/duplex path 17 extending to a turning section and a duplex section which will be described. Further, the intermediate guide 14 and a guide 18 define the turn discharge path 9 (FIG. 1) therebetween.

The turning section mentioned above includes inlet guides 20 and 21, a sensor 22, a turn roller 23, a reverse drive roller 24, a reverse driven roller 25, a path selector 26, a pair of side fences 27 (only one is visible), and a guide 28 for guiding paper conveyance. The reference numeral 29 designates a turn path. The side fences 27 which will be described specifically later are representative of a paper positioning device according to a preferred embodiment of the present invention.

The duplex section includes a drive roller 31, a driven roller 32, a path selector 33, an upper guide 34, a lower guide 35, a left drive roller 36, a left driven roller 37, a right drive roller 38, a left driven roller 39, and a re-feed guide 40. A drive roller or grip roller 41 and a driven roller 42 are positioned downstream of the re-feed guide 40 in the direction in which the paper P is re-fed define the duplex section to the image forming unit 4. The upper guide 34 and lower guide 35 define the duplex path 10 mentioned earlier therebetween.

In operation, the path selector 13 steers the paper P which has entered the turn-over/duplex unit 7 into either one of the usual discharge path 8 or the turn-over/duplex path 17. When the path selector 13 is rotated counterclockwise, as viewed in FIG. 2, to a position indicated by a solid line, the path selector 13 steers the paper P into the turn-over/duplex path 17. When the path selector 13 is rotated clockwise, as viewed in FIG. 2, to a position indicated by a phantom line, the path selector 13 steers the paper P into the usual discharge path 8.

The paper P which has entered the turn-over/duplex path 17 advances to a gap between the inlet guides 20 and 21. The sensor 22 senses the trailing edge of the paper P. Biasing means (not shown) continuously biases the free edge of the path selector 26 in an upward direction. In addition, the free edge of the path selector 26 is engaged with a turn roller 23 in a direction substantially perpendicular to the sheet surface of FIG. 2. In this condition, the path selector 26 presses the paper P against the turn roller 23 with the result that the paper P is conveyed by the turn roller 23.

As soon as the trailing edge of the paper P moves away from the path selector 26, the paper P is brought to a position between the side fences 27 which are preferably positioned in the front-and-rear direction thereby. Subsequently, the reverse driven roller 25 is lowered to a position indicated by a phantom line in FIG. 2 in response to the output of the sensor 22. In this position, the reverse driven roller 25 cooperates with the reverse drive roller 24 to reverse the direction of conveyance of the paper P. When the paper P is conveyed by the rollers 24 and 25 along the turn-over path 29 until it has been nipped by the drive roller 31 and driven roller 32, the reverse driven roller 25 is returned to a position indicated by a solid line in FIG. 2. At the same time, the side fences 27 are moved away from each other to their inoperative or stand-by positions.

The path selector 33 steers the paper P being conveyed by the drive roller 31 and driven roller 32 into either one of the turn-over discharge path 9 and duplex path 10. More specifically, the path selector 33 steers the paper P into the turn-over discharge path 9 when rotated clockwise, as viewed in FIG. 2, to a solid-line position or into the duplex path 10 when rotated counterclockwise to a phantom-line position. The paper P which has entered the duplex path 10 is again fed toward the image forming unit 4 by the grip roller 41 and driven roller 42, so that an image is formed on the other side of the paper P.

Figure 3:
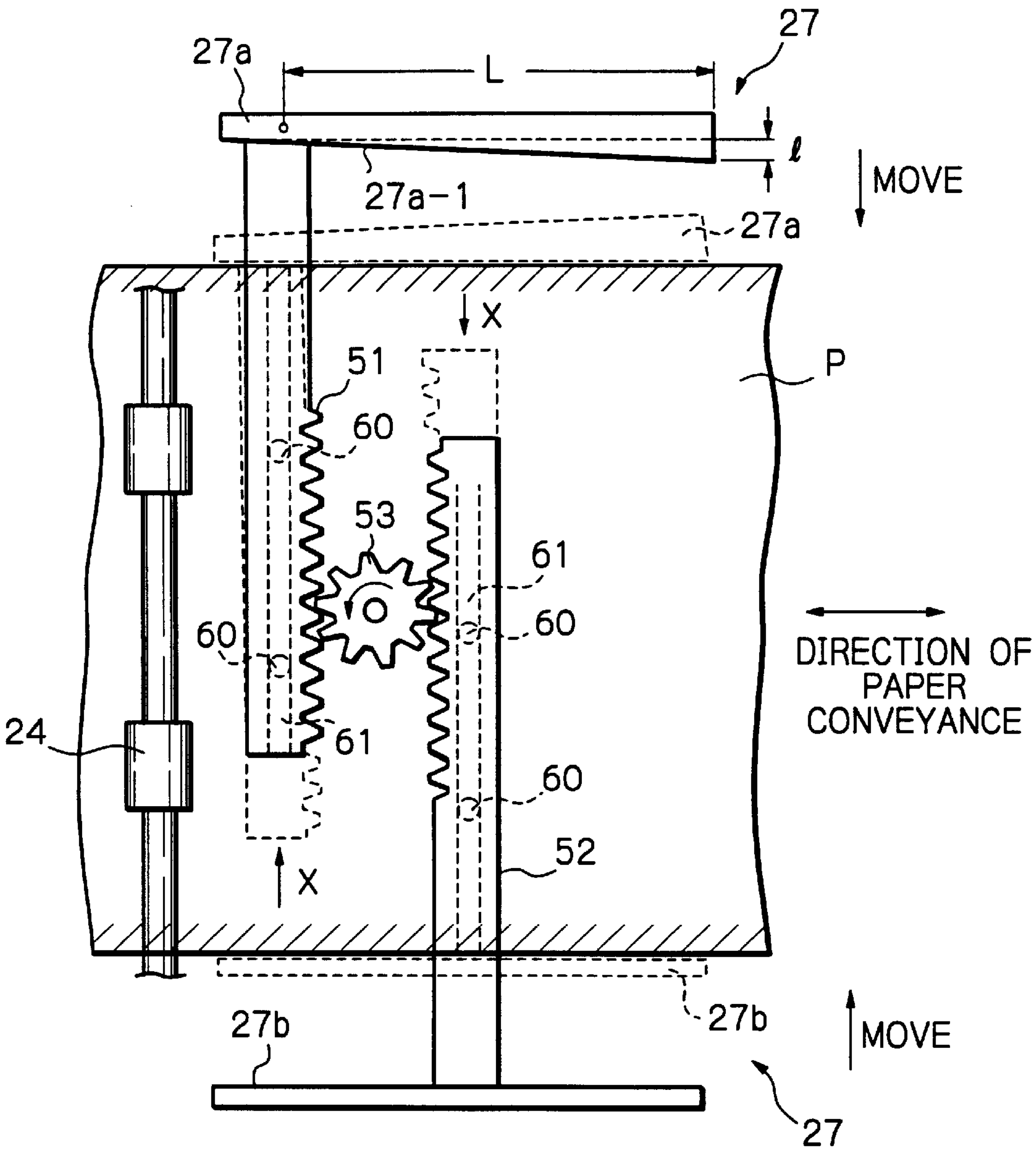
FIG. 3 is a plan view showing a pair of side fences included in the turn-over/duplex unit and representative of a paper positioning device according to a referred embodiment of the present invention, along with a mechanism for driving the side fences.
Figure 4:
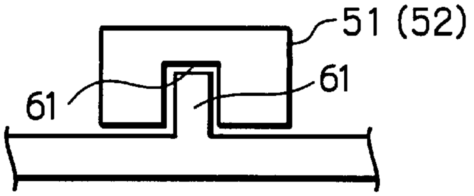
FIG. 4 is a fragmentary view as seen in a direction indicated by an arrow X in FIG. 3.

The side fences 27 of the present preferred embodiment and a mechanism for driving the side fences 27 will be described specifically with reference to FIG. 3. As shown, the side fences 27 are preferably implemented as a front side fence **27*b* and a rear side fence 27*a*. The rear side fence 27*a* is preferably affixed to a rear rack 51 at its left end portion, as viewed in FIG. 3, and preferably defines a substantially L-shaped configuration. The rear rack 51 is substantially perpendicular to the rear side fence 27*a*. The front side fence 27*b* is preferably affixed to a front rack 52 at its intermediate portion so as to define a substantially T-shaped configuration. The front rack 52 is preferably substantially perpendicular to the front side fence 27*b*. As shown in FIGS. 3 and 4, the racks 51 and 52 each preferably include a guide channel 61. The guide channel 61 extends in the up-and-down direction as viewed in FIG. 3. Two guide pins 60 are received in each of the guide channels 61 of the racks 51 and 52. In this configuration, the racks 51 and 52 are slidable in the up-and-down direction in FIG. 3. To insure the smooth movement of the racks 51 and 52, gaps exist between the walls of the guide channels 61 and the guide pins 60. The gaps, however, are apt to cause the racks 51 and 52 to shake during movement. This is particularly true with the rear rack 51 and rear side fence 27*a*** connected together to define the substantially L-shaped configuration.

The racks 51 and 52 are operatively connected via a pinion 53. The side fences **27*a* and 27*b* are movable between operative positions indicated by phantom lines and inoperative or stand-by positions indicated by solid lines. More specifically, when the pinion 53 is rotated counterclockwise, as viewed in FIG. 3, such movement causes the side fences 27*a* and 27*b* to move toward each other to the operative positions for positioning the paper P. When the pinion 53 is rotated clockwise, as viewed in FIG. 3, this movement causes the side fences 27*a* and 27*b*** to move away from each other to the inoperative positions.

In the present preferred embodiment, the rear side fence **27*a* preferably includes a positioning surface 27*a*-1 inclined relative to the widthwise edge of the paper P, i.e., in the direction of paper conveyance. The positioning surface 27*a*-1 is inclined such that the surface 27*a*-1 gradually approaches the edge of the paper P as the distance between the surface 27*a*-1 and the rear rack 51 increases. More specifically, the positioning surface 27*a*-1 is inclined in a rightward downward as viewed in FIG. 3. The rack 51 is connected to the left portion of the side fence 27*a* with respect to the center in the direction of paper conveyance. It follows that the right portion of the side fence 27*a* has greater play than the left portion due to the play of the side fence 27*a* and the play attributable to the substantially L-shaped connection of the side fence 27*a* and rack 51. The substantially L-shaped connection increases an error at the right end of the side fence 27*a*, as viewed in FIG. 3, due the distance to the rack 51**.

In the above configuration, when the pinion 53 rotates counterclockwise to move the rear side fence **27*a* from the inoperative position to the operative position, the positioning surface 27a-1 becomes substantially parallel to the widthwise edge of the paper P. The positioning surface 27a-1** therefore accurately corrects the skew of the paper P.

As shown in FIG. 3, assume that the distance between the right end of the rear side fence 27a and the point where the side fence 27a is connected to the rear rack 51 is L, and that the positioning surface 27a-1 protrudes at its right end by a dimension of I. Experiments taking account of the above play showed that the rear side fence 27a was capable of operating reliably and correcting the skew accurately when the distance L was about 150 mm and the dimension of projection I was about 0.8 mm. However, the distance L and dimension I are not limited to the above specific values. It is preferable to determine the length of the side fence 27a required of the apparatus and thereby insure the stable operation of the paper positioning device, then calculate play, and then determine the dimension of the projection based on the play.

In summary, in accordance with preferred embodiments of the present invention, at least one of a pair of side fences constituting a paper positioning device has an inclined positioning surface. The positioning surface can therefore contact the widthwise edge of a paper substantially parallel to the paper and reliably correct the skew of the paper even when the side fence has play or positional deviation.

Various modifications will become possible for those skilled in the art after receiving the teachings of the present disclosure without departing from the scope thereof. For example, in the illustrated preferred embodiments, only the rear side fence 27a has its positioning surface 27a-1 inclined relative to the widthwise edge of the paper P. If desired, the front side fence 27b may also be provided with such an inclined positioning surface. The present invention is similarly applicable to an apparatus for turning over papers or a duplex apparatus.

What is claimed is:

1. A paper positioning apparatus for use in an image forming apparatus, the paper positioning apparatus comprising:

at least one pair of paper positioning members, each positioning member having a first end and a second end, said at least one pair of positioning members positioned on at least one of a paper conveyance path having a direction of paper conveyance and a paper feeder, each positioning member having a paper positioning surface arranged to position opposite widthwise edges of a paper being fed; wherein said paper conveyance path is configured and adapted to convey paper, having opposed faces, widthwise edges, and lengthwise edges, such that the paper faces are substantially parallel to the conveyance path, and the paper is conveyed in a lengthwise direction;

said paper positioning members are positioned on the paper conveyance path extending along a paper turn-over unit;

said paper positioning members are arranged to position the paper before said paper which has entered said paper conveyance path is turned over by paper turn-over unit; and at least one of said pair of paper positioning members has an inclined positioning surface arranged, such that the inclined surface extends in the direction of said paper conveyance path, and said second end of said paper positioning member is positioned relative to said lengthwise paper conveyance path at a distance less than that of said first end of said paper positioning member.

2. An apparatus as claimed in claim 1, wherein said pair of paper positioning members comprise a front side fence and a rear side fence.

3. An apparatus as claimed in claim 2, further comprising a pair of racks and a single pinion, wherein said front side fence and said rear side fence are respectively connected to the pair of racks, the pair of racks being movable back and forth in a direction that is perpendicular to a direction of paper conveyance by the single pinion.

4. An apparatus as claimed in claim 3, wherein said pair of racks each includes a guide channel extending perpendicularly to the direction of paper conveyance and receiving at least two guide pins, whereby said pair of racks are slidable in a directly that is perpendicular to the direction of paper conveyance.

5. A paper positioning apparatus positioned on at least one of a paper conveyance path and a paper feeder for positioning opposite widthwise edges of a paper, and said paper positioning members arranged to position the paper before said paper which has entered said paper conveyance path is turned over by paper turn-over unit, said paper positioning apparatus comprising:

means for conveying paper along a paper conveyance path, having a direction of paper conveyance, said means for conveying paper configured and adapted to convey paper, having opposed faces, widthwise edges, and lengthwise edges, in a lengthwise direction, such that the paper faces are substantially parallel to the conveyance path;

a pair of paper positioning means, each positioning member having a first end, a second end, and a respective paper positioning surface; and drive means for driving said pair of paper positioning means; wherein at least one of said pair of paper positioning means having said respective paper positioning surface inclined in said direction of paper conveyance, such that the inclined surface extends in the direction of said paper conveyance path, and said second end of said paper positioning member is positioned relative to said lengthwise paper conveyance path at a distance less than that of said first end of said paper positioning member.

6. An apparatus as claimed in claim 5, wherein said pair of paper positioning means comprise a front side fence and a rear side fence.

7. An apparatus as claimed in claim 6, wherein said drive means comprises a pair of racks respectively connected to said front side fence and said rear side fence, and a pinion operatively connected with said pair of racks for causing said pair of racks to move back and forth substantially perpendicularly to the direction of paper conveyance.

8. An apparatus as claimed in claim 7, wherein said pair of racks each includes a guide channel extending substantially perpendicularly to the direction of paper conveyance and receiving at least two guide pins and are slidable substantially perpendicularly to the direction of paper conveyance.

* * * * *